(12) United States Patent
Arafeh (10) Patent No.: US 7,865,711 B2
(45) Date of Patent: Jan. 4, 2011

(54) EFFICIENT METHOD FOR OPERATING SYSTEM DEPLOYMENT

(75) Inventor: Samer N. Arafeh, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 591 days.

(21) Appl. No.: 11/949,495

(22) Filed: Dec. 3, 2007

(65) Prior Publication Data

US 2009/0144532 A1 Jun. 4, 2009

(51) Int. Cl.
*G06F 15/177* (2006.01)
(52) U.S. Cl. ............................................. 713/2; 713/1
(58) Field of Classification Search ........................ None
See application file for complete search history.

(56) References Cited

U.S. PATENT DOCUMENTS

| | | | |
|---|---|---|---|
| 6,874,060 B2 | 3/2005 | Blood | |
| 6,961,941 B1 * | 11/2005 | Nelson et al. | 719/319 |
| 7,243,224 B2 | 7/2007 | Nair | |
| 7,356,679 B1 * | 4/2008 | Le et al. | 713/1 |
| 2003/0110351 A1 | 6/2003 | Blood et al. | |
| 2005/0160150 A1 | 7/2005 | Kao | |
| 2005/0160256 A1 | 7/2005 | Huang et al. | |
| 2006/0010316 A1 | 1/2006 | Burokas | |
| 2006/0020779 A1 | 1/2006 | Rothman et al. | |
| 2006/0036832 A1 | 2/2006 | Makiyama | |
| 2006/0064688 A1 | 3/2006 | Tseng | |
| 2006/0143433 A1 | 6/2006 | Stutton | |
| 2007/0005919 A1 | 1/2007 | van Riel | |
| 2007/0162901 A1 | 7/2007 | Oh | |
| 2007/0260831 A1 | 11/2007 | Michae et al. | |
| 2008/0120403 A1 * | 5/2008 | Lowery et al. | 709/223 |

OTHER PUBLICATIONS

Ways to Deploy an Operating System to a Virtual Machine, http://technet2.microsoft.com/windowsserver/en/library/37e6a477-b308-457c-9653-31ec3c43a9671033.mspx?mfr=true.
VMware Workstation 4.5, http://www.vmware.com/support/ws45/doc/disks_config_ws.html.
Installing an Operating System onto a Raw Partition from a Virtual Machine Using VMware Workstation for Linux, http://www.vmware.com/support/reference/linux/osonpartition_linux.html.

* cited by examiner

*Primary Examiner*—Dennis M Butler
(74) *Attorney, Agent, or Firm*—Shook, Hardy & Bacon LLP (57) ABSTRACT

Method and computer storage media for efficiently deploying an operating system are provided. A virtual hard drive file is received by a computing device. Upon receipt of the virtual hard drive file, the computing device is enhanced to expose and mount the virtual hard drive as a drive and boot option for the computing device. Thereafter, an initial boot sequence may be commenced utilizing the virtual hard drive file as the boot source. In some embodiments, a boot manager enhancer and a translator are utilized to do one or more of expose, mount and translate the virtual hard drive file. In some embodiments, a virtual SCSI miniport driver is utilized to do one or more of expose, mount, and translate the virtual hard drive file.

20 Claims, 5 Drawing Sheets

EFFICIENT METHOD FOR OPERATING SYSTEM DEPLOYMENT

BACKGROUND

Generally, an operating system is a large collection of individual files that all work in combination to provide an operating environment for a computing device. The individual files that comprise an operating system are typically maintained within the computing device in a complex arrangement of directories and folders. Additionally, the deployment and distribution of an operating system or a portion of an operating system to remote nodes or computing devices may be a difficult task because of the size and complexity of the operating system at each of the remote computing devices.

SUMMARY

Embodiments of the present invention relate to methods and computer storage media for efficiently deploying an operating system. A compounded virtual hard drive file, that at least contains operating system instructions, is distributed to a computing device. Upon receiving the virtual hard drive file, the computing device is enhanced to allow the virtual hard drive file to be a boot option and a mountable drive. The computing device may then utilize the virtual hard drive file as a drive beginning with the initial boot sequence.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments are described in detail below with reference to the attached drawing figures, wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to methods and computer storage media for efficiently deploying an operating system. A compounded virtual hard drive file, that contains operating system instructions, is distributed to a computing device. Upon receiving the virtual hard drive file, the computing device is enhanced to allow the virtual hard drive file to be a boot option and a mountable drive. The compounded virtual hard drive file may contain additional data and information that will allow the virtual hard drive file to be exposed as a boot option and to be mounted as a drive in the computing device. The computing device may then utilize the virtual hard drive file as a physical drive beginning with the initial boot sequence.

Accordingly, in one aspect, the present invention provides one or more computer storage media having computer-executable instructions embodied thereon that, when executed, perform a method for deploying an operating system on a computing device. The method includes receiving a virtual hard drive file having one or more operating system instructions associated therewith. The virtual hard drive file also is associated with a boot manager enhancer and a translator. The method additionally includes enhancing a boot manager utilizing the boot manager enhancer, determining a virtual hard drive file position, storing the virtual hard drive file position, implementing the translator to apply the virtual hard drive file position to read/write requests, and commencing an initial boot sequence from the virtual hard drive file.

In another aspect, the present invention provides a method for efficiently deploying an operating system. The method includes compounding a virtual hard drive file, a boot manager enhancer, and a translator; and communicating the virtual hard drive file, the boot manager enhancer, and the translator to a computing device, wherein the virtual hard drive file is capable of performing an initial boot sequence on the computing device.

A third aspect of the present invention provides computer storage media having computer-executable instructions embodied thereon that, when executed, perform a method for deploying an operating system to a computing device. The method comprises receiving a virtual hard drive file, wherein the virtual hard drive file is comprised of operating system instructions. The virtual hard drive file may be exposed and mounted as a SCSI disk and is associated with a boot manager enhancer and a translator. The method further includes enhancing a boot manager utilizing the boot manager enhancer, wherein the boot manager enhancer provides a boot entry to expose the virtual hard drive file as a boot option to the computing device; determining a virtual hard drive position; storing the virtual hard drive position to be utilized by the translator; implementing the translator to read/write requests, wherein the translator translates read/write requests between a logical offset and a physical offset based on the virtual hard drive file position; implementing a SCSI driver, wherein the virtual hard drive file can be mounted as a SCSI disk; and commencing an initial boot sequence of the computing device from the virtual hard drive file.

Having briefly described an overview of embodiments of the present invention, an exemplary operating environment suitable for implementing embodiments hereof is described below.

Figure 1:
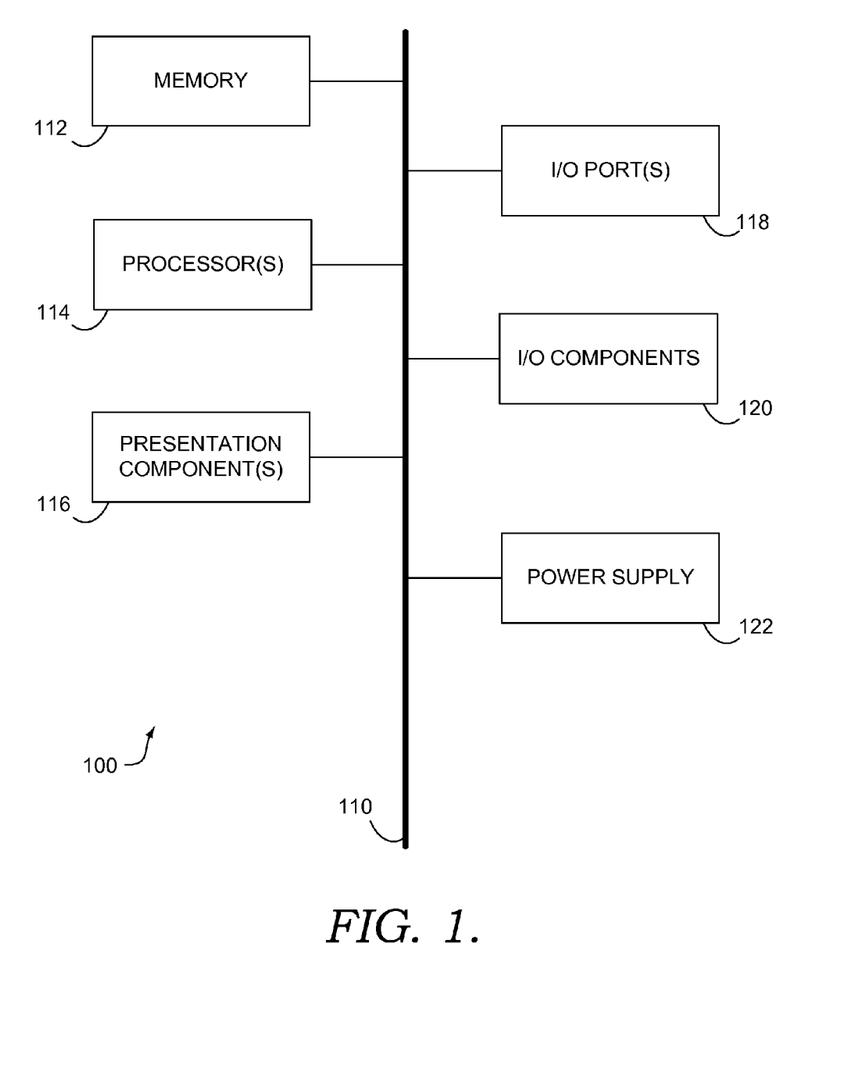
FIG. 1 is a block diagram of an exemplary computing environment suitable for use in implementing embodiments of the present invention.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier waves or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

Figure 2:
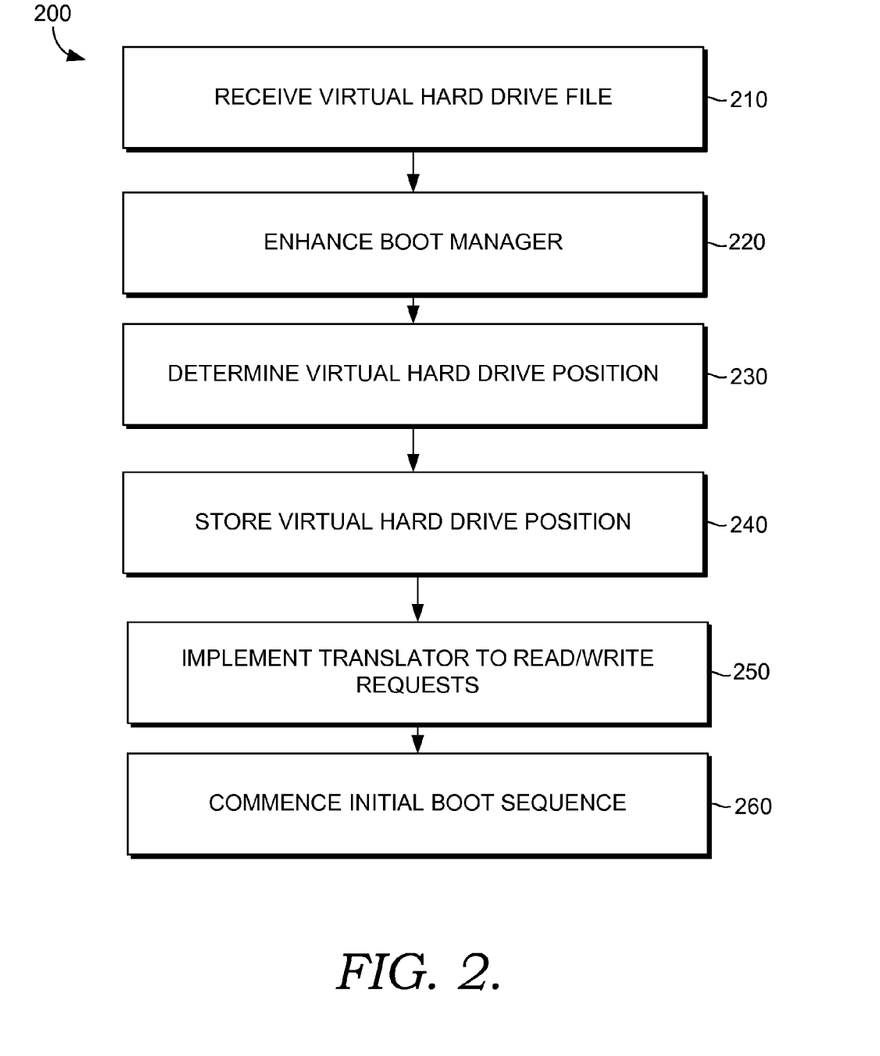
FIG. 2 is a flow diagram of an exemplary method for deploying an operating system on a computing device, in accordance with an embodiment of the present invention.

With reference to FIG. 2, a flow diagram is shown that illustrates an exemplary method 200 for deploying an operating system on a computing device, in accordance with an embodiment of the present invention. Initially, as indicated at block 210, a virtual hard drive file is received. In addition to receiving the virtual hard drive file, at least a boot manager enhancer and a translator are received. The virtual hard drive file, the boot manager enhancer, and the translator may be received as a single file or they may be received as two or more files. In embodiments, the virtual hard drive file, the boot manager enhancer, and the translator are received in connection with one or more computer readable media.

The virtual hard drive file received at block 210 generally includes operating system instructions for a computing device, such as the computing device 100 of FIG. 1. An operating system or operating system instructions that may be included with or in a virtual hard drive file includes software that manages the sharing of resources of a computer system and provides an interface to access those resources. The virtual hard drive file may additionally include one or more of a driver, an operating system loader, a boot loader, an additional stage boot loader, program modules, and other components known to those skilled in the art to facilitate the initial boot sequence of a computing device. The virtual hard drive file is a dynamic file that allows the manipulation of the data and information contained within. This dynamic characteristic of a virtual hard drive file allows persistent data to be maintained in association with and/or on the virtual hard drive file. This is advantageous because a static format does not allow for a traditional operating system experience if data and information is not capable of being persistent.

Subsequently, as indicated at block 220, the boot manager is enhanced. The boot manager may be enhanced by the boot manager enhancer, where the enhancement may include the addition of a boot entry within the boot manager that exposes the virtual hard drive file as a boot option for the computing device. A boot manager typically includes boot entries for available sources of bootable instructions. The enhancement of the boot manager to include a boot entry for the virtual hard drive allows the virtual hard drive to be included as a bootable option for the computing device. In order for a virtual hard drive file to be exposed as a boot option to a computing device, the boot manager enhancer provides information to the computing device that is typically supplied by a physical drive. A physical drive traditionally includes a hard disk drive, floppy drive, tape drive, CDROM, DVD or similar media drive. The information that is typically supplied by a physical disk, and therefore may be supplied by the boot manager enhancer, includes the header and footer information detailing the specifications of the associated drive. The boot-manager-enhancer-supplied header and footer information supplements the virtual hard drive file so that it becomes a drive that may be exposed and mounted.

The enhancement of the boot manager by the boot manager enhancer may require additional intervention by a computing device or the user of the computing device. This additional intervention may include the manipulation of computing instructions contained with the operating system or an alteration of components of the operating system. Additionally, the boot manager enhancer may also enhance an operating system loader and a kernel of the computing device to allow the virtual hard drive file to be exposed and mounted as a drive in the computing device.

With reference to block 230, the position of the virtual hard drive file is then determined. The virtual hard drive can be stored in association with the computing device once it has been received. In an exemplary embodiment, the virtual hard drive file is stored on a hard disk associated with the computing device once it has been received by the computing device. It will be understood and appreciated by those skilled in the art that the virtual hard drive file may be stored, held, or located on any of the computer readable media, devices, or components previously discussed in association with computing device 100.

The position of the virtual hard drive file may be indicated in various ways. For example, the position of the virtual hard drive file may be indicated by one or more of the drive identifier, directory, track, sector, range, or partition location of the hard disk where the virtual hard drive file is stored. As an exemplary determination of the position of the virtual hard drive, the position may be identified by the partition locations where the virtual hard drive file resides on the physical hard drive of the computing device.

As seen at block 240, subsequently the virtual hard drive position is stored. The position of the virtual hard drive may be stored within the computing device, for instance in the memory 112 previously discussed in relation to computing device 100 of FIG. 1. In addition to the virtual hard drive position being stored locally, the virtual hard drive position, as determined in block at 230 may also be stored over a network or other remote location.

At block 250, the translator is then implemented to read/write requests. The translation at block 250 may translate one or more read and write (read/write) requests that are communicated by the computing device to the memory, the driver, the volume driver, and the disk driver being utilized in association with the requests. The read/write requests may be generated by a processor, for instance, processor 114 of FIG. 1, and directed to a memory, e.g., memory 112 of FIG. 1. An example of translating read/write requests includes translating a read/write request from the processor of the computing device that received the virtual hard drive file at block 210 to the virtual hard drive utilizing the position stored, as indicated at block 240. In this example the processor generates a read/write request that is directed to a physical hard disk associated with the computing device where the virtual hard drive has been stored. The translator applies the position of the virtual hard drive file to create a translation between the requested physical offset and the virtual hard drive file's logical offset. The logical offset is known as a result of the determined and stored position of the virtual hard drive file, as illustrated at blocks 230 and 240, respectively. In this example the processor generates a read/write request directed to a physical offset of a physical disk that contains a virtual hard drive file. The read/write request is then translated based on the physical offset of the drive and the logical offset of the virtual hard drive file. It will be understood and appreciated by those skilled in the art that the translation between a physical offset a logical offset is not limited to one direction of translation. The translation may also occur between a logical offset and a physical offset. Additionally, the translation may occur between other commands and requests issued by the computing device and its associated processor. The translator is not limited to read/write requests nor is it limited to translation based on the offset locations of the virtual hard drive file, the physical drive, or the request. Any and all such embodiments, and any combination thereof, are contemplated to be within the scope of embodiments of the present invention.

The translation represented at block 250 allows the read/write requests generated by the computing device to be translated not only based on the physical drive in association with which the virtual hard drive file resides, but the translator may also translate to and from other identifying positions associated with the virtual hard drive. For example, the logical offset previously mentioned may include blocks within the virtual hard drive file. Because the virtual hard drive file may not be a physical disk, the virtual hard drive may not utilize all of the previously mentioned position identifiers, but instead, the translator may translate to a block position within the virtual hard drive file. This translation allows a read/write request that was generated as a physical offset to be translated to a logical offset that may include block position references within the virtual hard drive file.

As indicated at block 260, the initial boot sequence is subsequently commenced. A computing device may perform an initial boot sequence anytime that the processor is booted and the processor has to search for a BIOS ROM to start a BIOS boot program. This occurs when the processor does not have instructions stored in its associated volatile memory. Typically, an initial boot sequence will occur when a computing device has been without power or turned off. These initial boot sequences may sometime be referred to as a cold boot. An initial boot can be contrasted to a "warm" boot. A warm boot is a boot sequence where the computing device begins to boot from a condition where data is stored in the processor's associated memory. An example of a warm boot is when a computing device user provides an input of ALT+CTRL+DELETE in a WINDOWS XP based operating system, available from Microsoft Corporation of Redmond Wash. In this situation the computing device has been functioning and data is stored in the processor's memory. An example of an initial boot or cold boot in a WINDOWS XP operating system environment is if the computing device has been powered completely down, commonly referred to as shut down, prior to commencing a boot sequence.

When a computing device that is currently utilizing a first operating system begins to emulate a second operating system, that boot of the emulated operating system is not an initial boot. In this situation, the computing device is functioning with the first operating system prior to booting the additional operating system. Because the first operating system is functioning on the computing device, the processor has data stored in its associated memory at the commencement of the boot and therefore the booting of the emulated operating system is not an initial boot.

One or more of the virtual hard drive, the boot manager enhancer, and the translator may contain a disk driver that allows the virtual hard drive file to be mounted as a disk in the computing device. Mounting of a disk in the computing device allows the computing device to access the data contained on the disk. In order for a disk to be mounted, there generally is a disk driver that facilitates the mounting and the resulting access to the data contained therein. The driver may allow access under any commonly known format such as, but not limited to, parallel ATA, integrated drive electronics, EIDE, serial ATA, SATA, SCSI, serial attached SCSI, SAS, enhanced small disk interface, fibre channel, fibre channel arbitrated loop, and FireWire interfaces. It will be recognized by one skilled in the art that various interfaces are available to mount a disk within the computing device. In embodiments of the present invention, the interface includes a SCSI driver that allows the virtual hard drive file to be exposed and mounted as a drive in a computing device. Additionally, in embodiments, the interface contains a SCSI miniport driver to facilitate exposing and mounting of the virtual hard drive file. A SCSI miniport driver utilizes a supplied port driver that acts as an interface between a SCSI miniport driver and the operating system. The SCSI miniport driver may therefore be a smaller driver because of an associated port driver. A SCSI driver or SCSI miniport driver may be used to expose and mount a virtual hard drive file and the resulting mounted virtual hard drive file may be recognized and utilized as a SCSI drive by a computing device.

Figure 3:
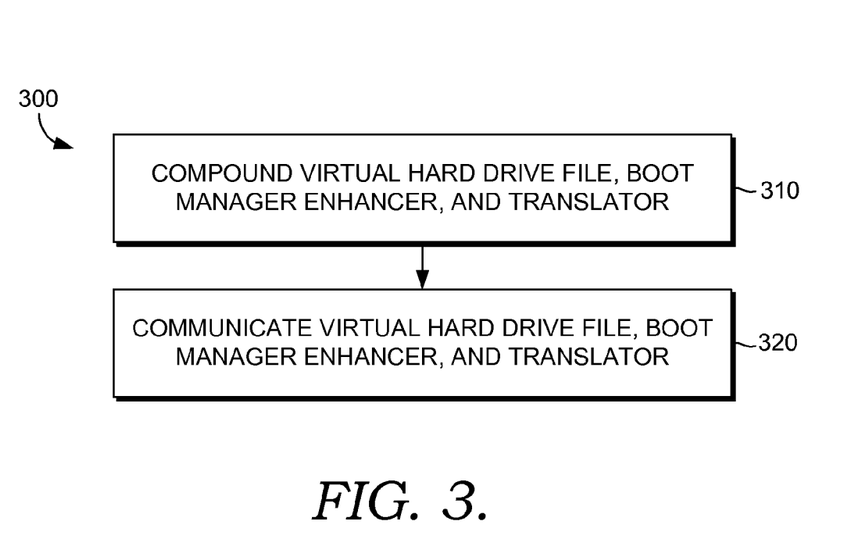
FIG. 3 is a flow diagram of an embodiment of the method for the efficient deployment of an operating system, in accordance with an embodiment of the present invention.

Turning now to FIG. 3, a flow diagram is illustrated that shows an exemplary embodiment of a method 300 for the efficient deployment of an operating system, in accordance with an embodiment of the present invention. Initially, as indicated at block 310, one or more of a virtual hard drive file, a boot manager enhancer, and a translator are compounded. Compounding, as used herein, can include the packaging or combining of the one or more files, instructions, or coding such that each individual element compounded may be individually identified, extracted, or manipulated from the whole of the resultant compound. Compounding allows for the plurality of elements to be grouped such that the resulting compound is an aggregate of the original elements. In an embodiment of the invention, the resulting compound consists of two or more files where one of the elements that comprise the compound remains as an individual element that is separate from the remaining compound. It will be understood and appreciated by those skilled in the art that the virtual hard drive file, the boot manager enhancer, and the translator may be one file or several files prior to the compounding of block 310. In an additional embodiment the boot manager enhancer and the translator are incorporated into other program modules, code, or instructions contained within the virtual hard drive file. The boot manager enhancer that is compounded at block 310 enhances a boot manager of a computing device with a boot entry that exposes the virtual hard drive file as a bootable drive option to the computing device. Additionally, the translator compounded at block 310 performs a translation between a physical offset and a logical offset for read/write requests. The resulting one or more compounds are also stored at block 310 for later communication.

Referring now to block 320, the virtual hard drive file, boot manager enhancer, and translator are subsequently communicated. Once one or more of these elements have been compounded, the resulting compound is communicated to a computing device, for instance computing device 100 of FIG. 1. The communication of the compound may occur through multiple methods. The compound may be communicated to the computing device through a USB drive, a diskette, a hard drive, a CD-ROM, DVD, computer tape, or other well known computer storage media. Additionally, the compound may be communicated to the computing device through various types of transmissions or broadcasts. This may include communication through a wired or wireless connection, an internet connection, an infrared connection, a Bluetooth connection, a satellite connection, a radio connection or other communication methods known in the art. Any and all such communication devices and methods, and any combination thereof, are contemplated to be within the scope of embodiments of the present invention.

The communication of the virtual hard drive, the boot manager enhancer, and the translator at block 320 may be a single communication or may be distributed over various communication methods and communication times. In one exemplary embodiment, the communication occurs over a network connection that connects multiple computing devices. An example is a large corporation that maintains a network to connect the many computing devices associated with the organization. The virtual hard drive, boot manager enhancer, and the translator are compounded into a single file that is communicated over the company's network. The company then communicates the compounded file to one, some, or all computing devices associated with the network. Communication of the compounded file facilitates the deployment of an operating system in an efficient and reliable manner. This efficient deployment is accomplished through the use one or more of the virtual boot manager enhancer, the translator, and a SCSI miniport driver.

Figure 4:
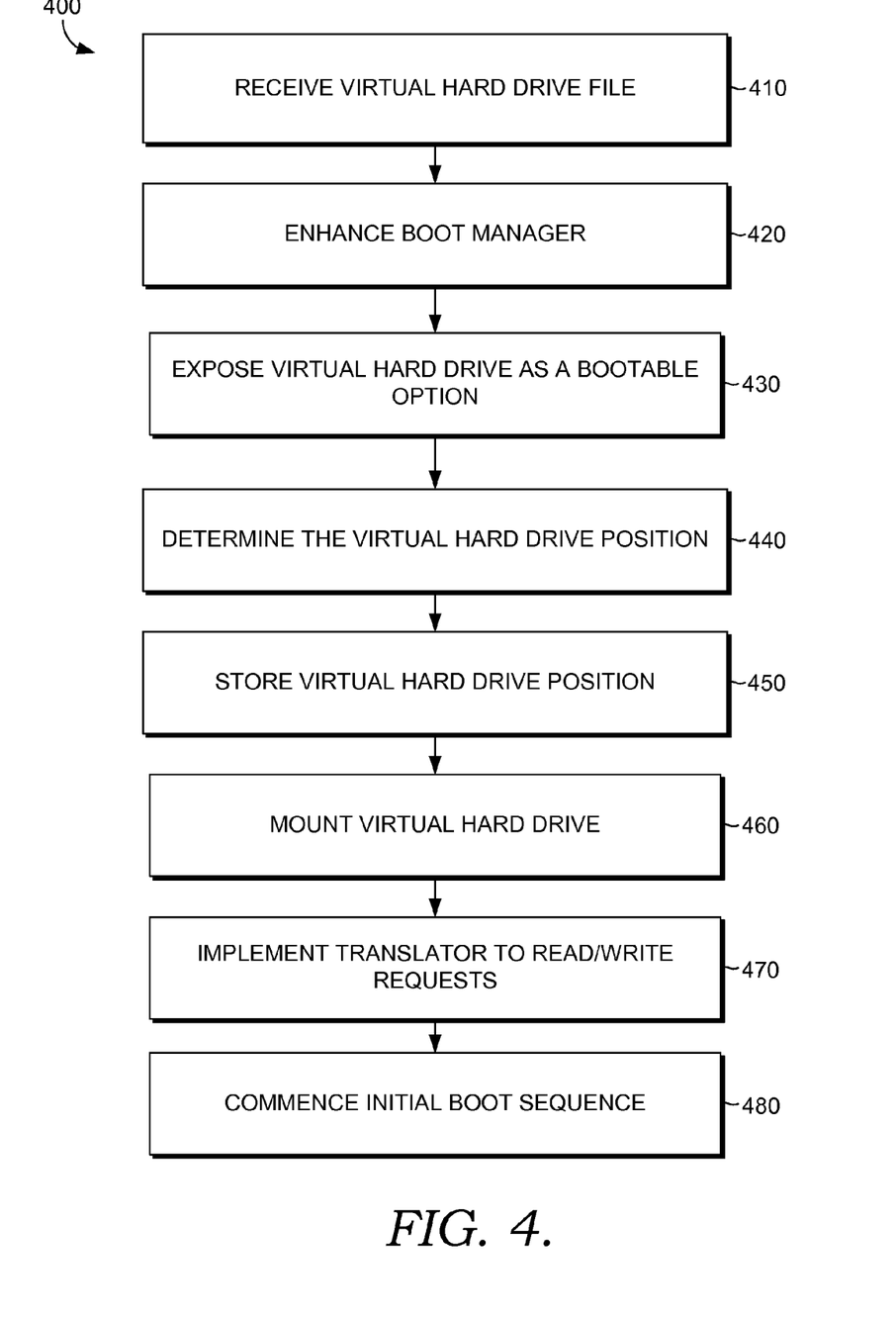
FIG. 4 is a flow diagram of another exemplary method for the efficient deployment of an operating system, in accordance with an embodiment of the present invention.

Turning now to FIG. 4, a flow diagram is illustrated that shows an additional embodiment of an efficient method 400 for the deployment of an operating system, in accordance with an embodiment of the present invention. Initially, at block 410, the virtual hard drive file is received. The virtual hard drive file is compounded with one or more of a boot manager enhancer and a translator. An embodiment of block 410 includes receiving a virtual hard drive file that has been compounded with both the boot manager enhancer and the translator. The virtual hard drive file contains one or more operating system instructions and computer modules to allow the computing device that receives the virtual hard drive file to perform an initial boot sequence with the virtual hard drive file.

Next, as indicated at block 420, a boot manager is enhanced. Enhancement of the boot manager is accomplished with a boot manager enhancer. The boot manager is enhanced by the boot manager enhancer through the inclusion of a boot entry to the boot manager. The boot entry is directed to the virtual hard drive file which consequently exposes the virtual hard drive file as a bootable option to the computing device. An embodiment of the invention provides that the boot manager is enhanced by the boot manager enhancer such that a boot entry that exposes the virtual hard drive file is included in the boot manager, as illustrated by block 430.

Next, as indicated at block 440, the position of the virtual hard drive is determined, that is, a position of the virtual hard drive file relative to a physical drive that the virtual hard drive is stored in association with. In an exemplary embodiment the position is provided as a sector and an offset of the physical disk. The position of the virtual hard drive is then stored by the computing device, as illustrated at block 450. The position is stored for later use by the translator to determine the translation between a physical offset and a logical offset of a read/write request.

Next, as indicated at block 460 the virtual hard drive is mounted. As previously discussed, when a drive is mounted a computing device associated with the mounted drive is able to access the data contained within the drive. An embodiment of the invention includes the use of a SCSI miniport driver to facilitate the mounting of the virtual hard drive file as a SCSI drive. As a result of this embodiment the virtual hard drive file is accessible by a computing device as a drive for reading and writing data.

Subsequently, as indicated at block 470 a translator is implemented to read/write requests. As previously discussed, a translator translates between physical offsets and logical offsets in read/write requests. In one exemplary embodiment the translation is based on the virtual hard drive file's position that was determined at block 440 and stored at block 450. Position information facilitates the translation between a physical offset and a logical offset.

As indicated at block 480, the initial boot sequence is then commenced. An initial boot sequence from the virtual hard drive file requires that the virtual hard drive was exposed as a bootable option, the virtual hard drive file's position was determined, the virtual hard drive file was mounted as a drive, a translator provided a translation between a physical offset and a logical offset, and the virtual hard drive file contained operating system instruction or other program modules.

Figure 5:
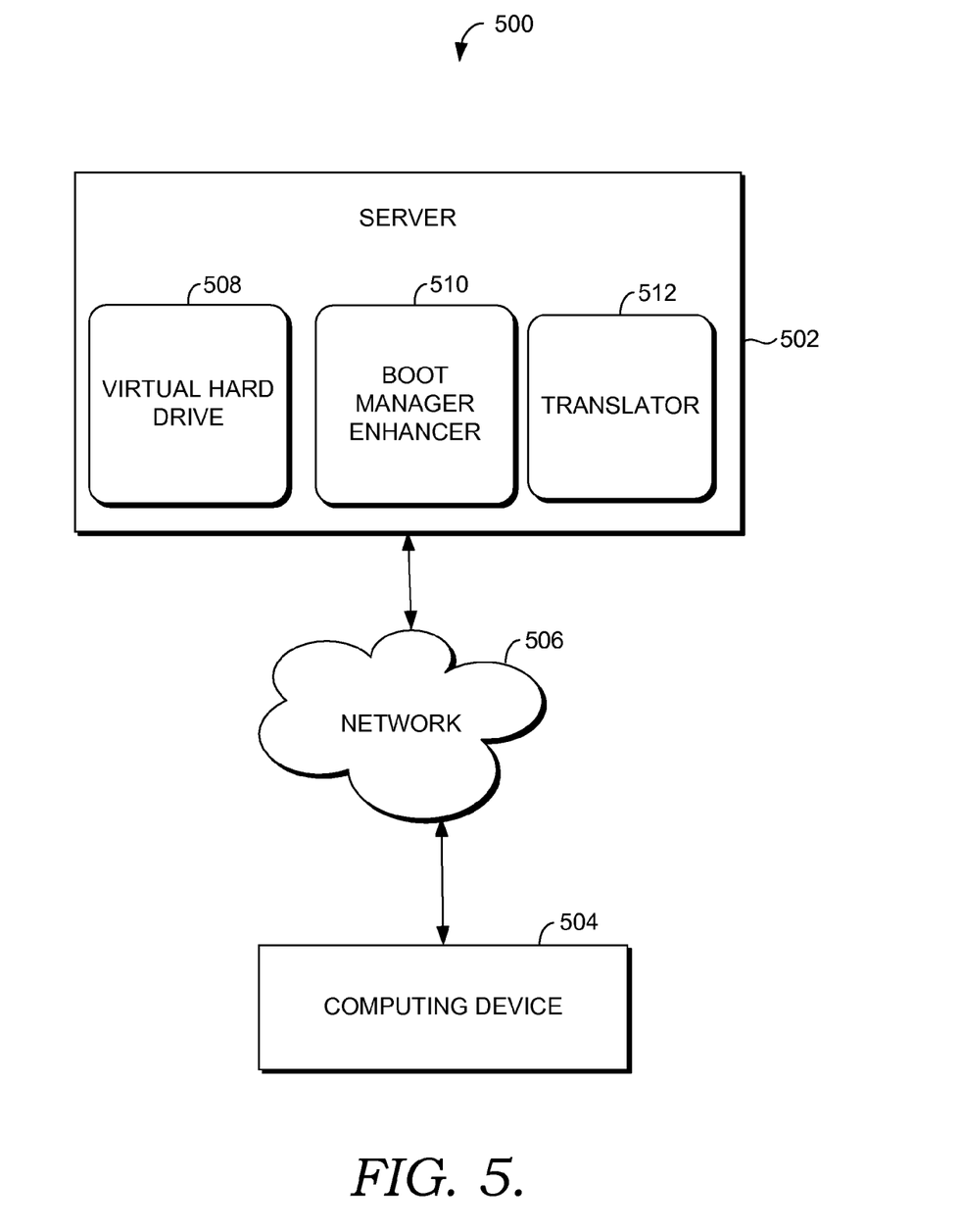
FIG. 5 is a block diagram illustrating an exemplary computing system architecture configured for use in implementing embodiments of the present invention.

With reference to FIG. 5, a block diagram is illustrated that shows an exemplary computing system architecture 500 configured for use in implementing embodiments of the present invention. It will be understood and appreciated by those of skilled in the art that the computing system architecture 500 shown in FIG. 5 is merely an example of one suitable computing system and is not intended to suggest any limitation as to the scope of use or functionality of the present invention. Neither should the computing system architecture 500 be interpreted as having any dependency or requirement related to any single module/component or combination of modules/components illustrated therein.

Computing system architecture 500 includes a server 502 and a computing device 504 in communication with one another via a network 506. The network 506 may include, without limitation, one or more local area networks (LANs) and/or wide area networks (WANs). Such networking environments are commonplace in offices, enterprise-wide computer networks, intranets and the Internet. Accordingly, the network 506 is not further described herein.

Each of the server 502 and the computing device 504 shown in FIG. 2 may be any type of computing device, such as, for example, computing device 100 described above with reference to FIG. 1. By way of example only and not limitation, each of the server 502 and the computing device 504 may be a personal computer, desktop computer, laptop computer, handheld device, mobile handset, consumer electronic device, and the like. Additionally, the computing device 504 may further include a keyboard, keypad, stylus, joystick, and any other input-initiating component that allows a user to provide wired or wireless data to the network 506. It should be noted, however, that the present invention is not limited to implementation on such computing devices, but may be implemented on any of a variety of different types of computing devices within the scope of embodiments hereof.

The server 502 may include any type of application server, database server, or file server configurable to perform the methods described herein. In addition, the server 502 may be a dedicated or shared server. Components of server 502 (not shown for clarity) may include, without limitation, a processing unit, internal system memory, and a suitable system bus for coupling various system components, including one or more databases for storing information (e.g., files and metadata associated therewith). Each server typically includes, or has access to, a variety of computer-readable media.

The server 502 includes a virtual hard drive 508, a boot manager enhancer 510 and a translator 512. In some embodiments, one or more of the illustrated components 508, 510 and 512 may be implemented as stand-alone applications. In other embodiments, one or more of the illustrated components 508, 510 and 512 may be integrated directly into the operating system of the server 502 and/or the computing device 504. It will be understood by those of ordinary skill in the art that the components 508, 510 and 512 illustrated in FIG. 5 are exemplary in nature and in number and should not be construed as limiting. Any number of components may be employed to achieve the desired functionality within the scope of embodiments of the present invention.

The virtual hard drive 508 may include operating system instruction and other computer modules that facilitate the deploying and booting of an operating system. Additionally, the virtual hard drive 508 may include drivers or other interfaces that may be required to expose and mount the virtual hard drive 508 as a drive in a computing device, such as computing device 504.

The boot manager enhancer 510 provides information, data, or instructions that allows a boot manager to be enhanced such that a virtual hard drive 508 may be recognized as a bootable option to the computing device 504. The boot manager enhancer 510, in one exemplary embodiment, alters a boot manager of a computing system that is associated with the virtual hard drive file to include a boot entry. The addition of the boot entry in the boot manager allows the virtual hard drive file to be exposed and mounted as a drive to the computing device.

The translator 512 includes information, data, or instruction to translate read/write requests. The translation done by translator 512 is between a physical offset and a logical offset to allow the virtual hard drive 508 to be accessed as a drive by the computing device 504. In an alternative embodiment, the translation of translator 512 translates between a position of the physical drive that stores the virtual hard drive file and a block position of the virtual hard drive file. The translator 512 allows the read/write requests generated by a computing device to be translated to requests that can access and manipulate data of the virtual hard drive 508.

It will be understood by those of ordinary skill in the art that computing system architecture 500 is merely exemplary. While the server 502 and computing device 506 are illustrated as a single units, one skilled in the art will appreciate that the server 502 and computing device 504 are scalable. For example, the server 502 may in actuality include a plurality of servers in communication with one another and computing device 504 may include a plurality of computing devices in communication with one another and server 502. The single unit depictions are meant for clarity, not to limit the scope of embodiments in any form.

As can be understood, embodiments of the present invention relate to methods and computer storage media for efficiently deploying an operating system. A compounded virtual hard drive file, that contains operating system instructions, is distributed to a computing device. Upon receiving the virtual hard drive file, the computing device is enhanced to allow the virtual hard drive file to be a boot option and a mountable drive. The compounded virtual hard drive file may contain additional data and information that will allow the virtual hard drive file to be exposed as a boot option and to be mounted as a drive in the computing device. The computing device may then utilize the virtual hard drive file as a virtual drive beginning with the initial boot sequence.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer storage media having computer-executable instructions embodied thereon that, when executed, perform a method for deploying an operating system on a computing device, the method comprising:

receiving a virtual hard drive (VHD) file having one or more operating system instructions, the VHD file being associated with a boot manager enhancer and a translator;

enhancing a boot manager utilizing the boot manager enhancer;
determining a VHD file position;
storing the VHD file position;
implementing the translator to apply the VHD file position to read/write requests; and
commencing an initial boot sequence from the VHD file.

2. The computer storage media of claim 1, wherein the method further comprises receiving the VHD file, the boot manager enhancer, and the translator as a single file.

3. The computer storage media of claim 1, wherein the method further comprises receiving the VHD file, the boot manager enhancer, and the translator as two or more files.

4. The computer storage media of claim 1, wherein enhancing a boot manager utilizing the boot manager enhancer comprises enhancing the boot manager with a boot entry that exposes the VHD file utilizing the boot manager enhancer.

5. The computer storage media of claim 1, wherein implementing the translator to apply the VHD file position to read/write requests further comprises translating requests between a logical offset and a physical offset utilizing the translator.

6. The computer storage media of claim 1, wherein the VHD file is associated with an operating system loader and a kernel, and wherein the method further comprises applying the translator to one or more of the boot manager, the operating system loader, and the kernel.

7. The computer storage media of claim 1, wherein the method further comprises mounting the VHD file to create a mounted VHD file.

8. The computer storage media of claim 1, wherein the method further comprises loading a SCSI driver to facilitate communication between the VHD file and the computing device.

9. The computer storage media of claim 8, wherein the mounted VHD file is represented as a SCSI disk to the computing device.

10. A method for efficiently deploying a computing device operating system, the method comprising:
compounding a virtual hard drive (VHD) file, a boot manager enhancer, and a translator; and
communicating the VHD file, the boot manager enhancer, and the translator to the computing device, wherein the VHD file is capable of performing an initial boot sequence on the computing device.

11. The method of claim 10, wherein the VHD file, the boot manager enhancer, and the translator are compounded as one file.

12. The method of claim 10, wherein the VHD file, the boot manager enhancer, and the translator are compounded so at least one of the VHD file, the boot manager enhancer, or the translator remain as an independent file.

13. The method of claim 10, wherein the method further comprises, the boot manager enhancer being associated with a VHD file boot entry that allows the VHD file to be exposed as a boot option to the computing device.

14. The method of claim 10, wherein the method further comprises translating between a logical offset and a physical offset utilizing the translator.

15. The method of claim 10, wherein the VHD file contains one or more operating system instructions.

16. The method of claim 10, wherein one or more of the VHD file, the boot manager enhancer, or the translator contain a SCSI driver.

17. The method of claim 10, wherein either the VHD file or the translator contain a SCSI driver to facilitate communication between the VHD file and the computing device.

18. The method of claim 10, further comprising mounting the VHD file to create a mounted VHD file, wherein the mounted VHD file is exposed as a logical disk to the computing device.

19. The method of claim 18, wherein the mounted VHD file is recognized as a SCSI disk by the computing device.

20. One or more computer storage media having computer-executable instructions embodied thereon that, when executed, perform a method for deploying an operating system to a computing device, the method comprising:
receiving a virtual hard drive (VHD) file, wherein the VHD file is comprised of one or more operating system instructions, wherein the VHD file can be exposed and mounted as a SCSI disk, and wherein the VHD file is associated with a boot manager enhancer and a translator;
enhancing a boot manager utilizing the boot manager enhancer, wherein the boot manager enhancer provides a boot entry to expose the VHD file as a boot option to the computing device;
determining a VHD file position;
storing the VHD file position to be utilized by the translator;
implementing the translator to read/write requests wherein the translator translates read/write requests between a logical offset and a physical offset based on the VHD file position;
implementing a SCSI driver, wherein the VHD file can be mounted as a SCSI disk; and
commencing an initial boot sequence of the computing device utilizing the VHD file.

* * * * *